June 11, 1968
H. BURR
3,387,478
TUBE FORMING APPARATUS
Filed April 14, 1966
3 Sheets-Sheet 1
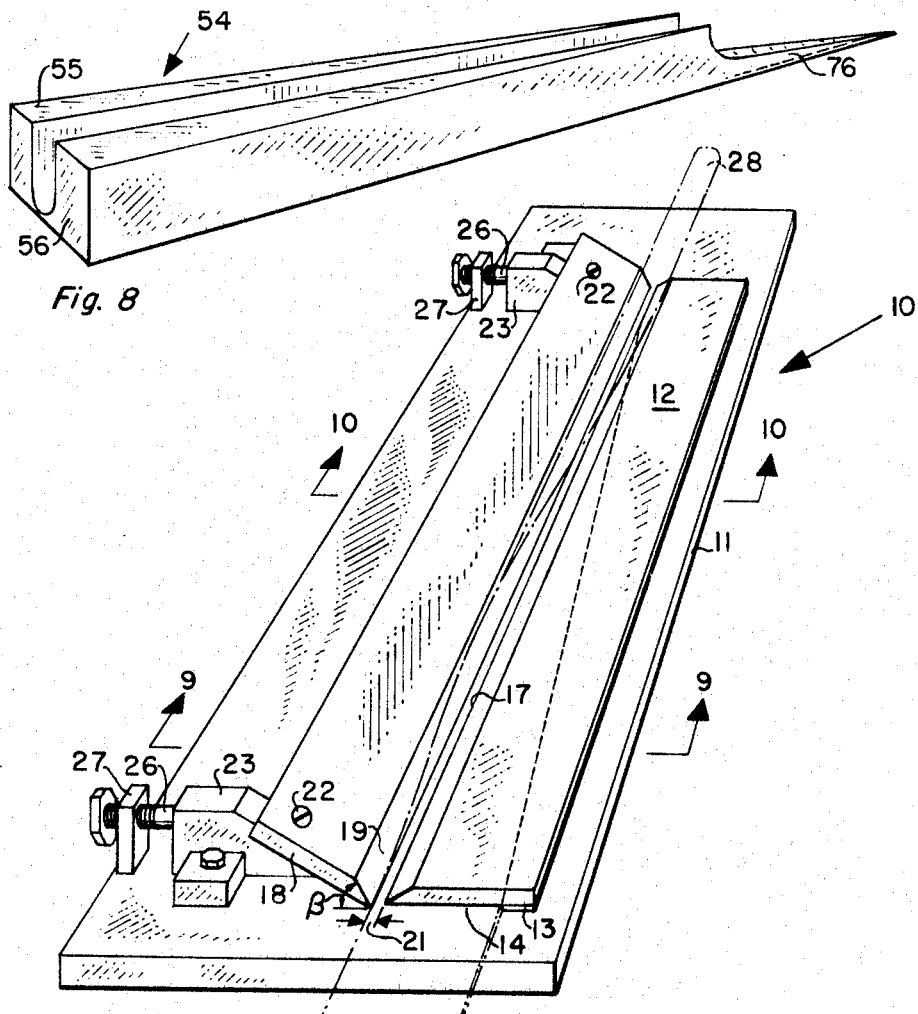
INVENTOR.
HARVEY BURR
BY 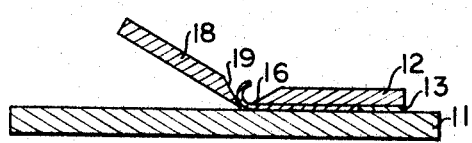
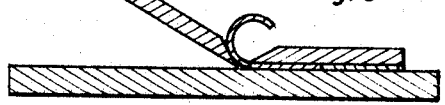
HIS AGENT

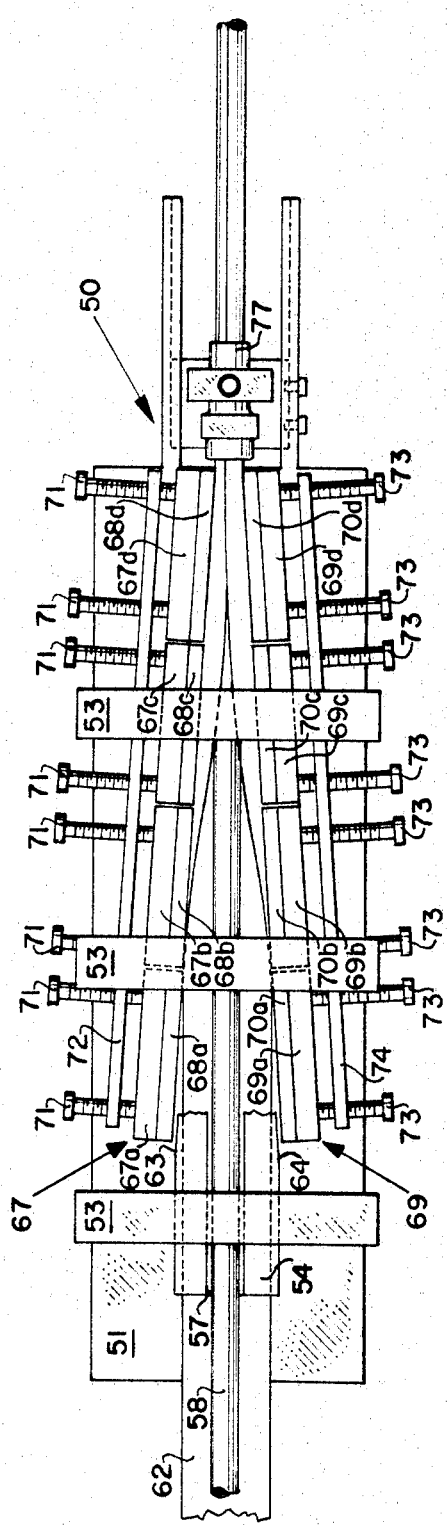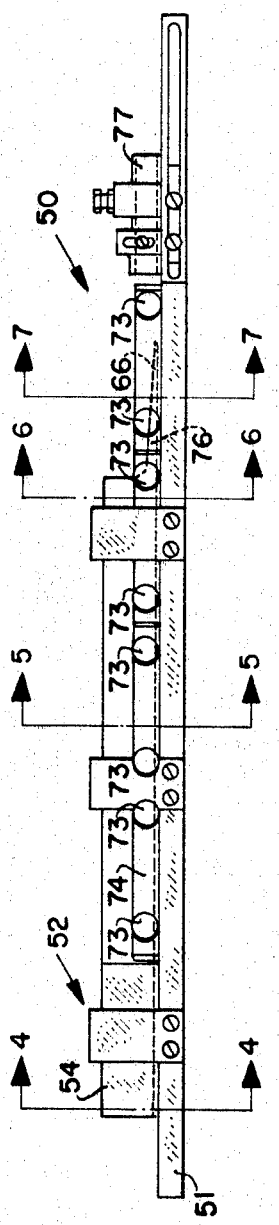

INVENTOR.
HARVEY BURR
BY V.F. Volk
HIS AGENT

United States Patent Office 3,387,478
Patented June 11, 1968

3,387,478
TUBE FORMING APPARATUS
Harvey Burr, Bronxville, N.Y., assignor to Anaconda
Wire and Cable Company, a corporation of Delaware
Filed Apr. 14, 1966, Ser. No. 542,644
7 Claims. (Cl. 72—176)

My invention relates to apparatus for continuously forming a strip into a tube and particularly to apparatus for forming the tube around an advancing core.

In the manufacture of metal conduits and seamed tubing it has long been known to pass an advancing flat strip through a conical die or through a series of curved rolls in order to form it into a cylindrical shape with a longitudinal seam that might be butted or overlapped, as required.

In the case of apparatus employing a conical die there has been the objection that each tube diameter requires a different die and also the objection that there is a large area of contact between the die surface and the strip, resulting in high friction.

In the case of curved rolls there has also been the objection that rolls must be contoured for a specific tube diameter, and also that the machining of roll contours is expensive and requires special skills.

I have invented apparatus that, unexpectedly, will form tubing from strip without the need for either dies or rolls, and which, moreover, is capable of forming different size tubes by making adjustments within a single apparatus. My apparatus has only a small area of the strip in loaded frictional contact, during bending, so that friction is minimized.

My apparatus for bending a tube from an advancing strip comprises a base plate and a guide plate parallel to the base plate and spaced away from it so as to define a passage confining and guiding the strip. The guide plate has an edge defining a lengthwise exit from the passage and in some embodiments of my invention, two such edges.

There are means blocking the passage at an acute angle to the edge to compel the strip to advance from the passage obliquely to the edge, and a baffle having a flat, strip-deflecting surface opposing and sloping away from each edge. In preferred embodiments my apparatus also comprises means for adjusting the baffles from the edges to change the radius of bending of the strip.

Particularly for bending strip around an advancing core, I have invented an apparatus comprising a base plate and a frame mounted in fixed relation to the plate. There is a guide plate and means supporting the guide plate from the frame so that it is parallel to the base plate and spaced to define a passage confining the strip. The support means for the guide plate is so spaced that it provides an unobstructed passage above the guide plate for the core. This apparatus also comprises two opposed deflecting baffles each with a flat, strip-deflecting surface opposing and sloping away from one of the edges. The narrow forward extension of the guide plate is cantilevered to avoid obstructing the passage of the core.

A more thorough understanding of my invention may be gained from the appended drawing.

In the drawing:

FIGURE 1 shows a perspective view of one embodiment of my apparatus.

FIGURE 2 shows a plan view of another embodiment of my apparatus particularly adapted for bending a tube around a core.

FIGURE 3 shows a side view of the apparatus of FIGURE 2.

FIGURE 8 shows a perspective view of a U-block comprising an element of one embodiment of my invention.

FIGURE 9 shows a section through the line 9—9 of FIGURE 1.

FIGURE 10 shows a section through the line 10—10 of FIGURE 1.

Figure 4:
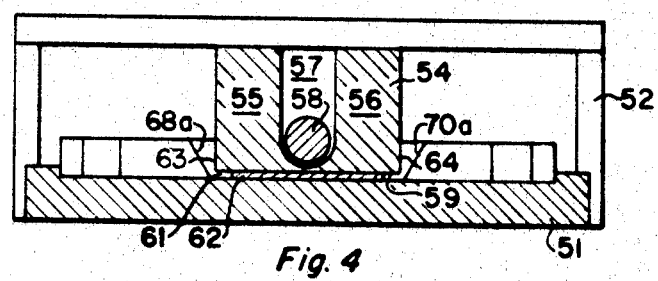
FIGURE 4 shows a section through the line 4—4 of FIGURE 3.

In FIGURES 1, 9 and 10 the tube bending apparatus indicated generally by the numeral 10 has a base plate 11 on which is supported a guide plate 12 spaced from the plate 11 by a shim 13 to provide a passage 14 for a metal strip 16. Although this means of spacing is preferred because of its simplicity, the plate 12 might also be recessed to provide the passage 14. The shim 13 is narrow at the upstream or entrance end of the bending apparatus 10 but at the downstream end it has widened to the full width of the plate 12. The plate 12 has a straight bevelled edge 17 which provides a lengthwise exit for the strip 16 which is being pulled by means such as a capstan, not shown, and is compelled to advance obliquely from the passage 14 because of the blocking effect of the shim 13 which forms an acute angle with the edge 17.

A baffle 18 is mounted on the base plate 11 parallel to the edge 17. The baffle 18 has a flat surface 19 facing the edge 17 and sloping upwardly away from the edge. The surface 19 deflects the strip 16 as it emerges from the passage 14 and bends it to a radius determined by the dihedral angle β of the surface 19 and the distance 21 of the baffle 18 from the edge 17. The angle β may have values varying from 45° to almost 90° but I found that 60° is most satisfactory. The surface 19 may advantageously be case hardened or may comprise a facing of hard material, such as carbide, cemented or otherwise fastened to the baffle 18, within the scope of my invention.

The baffle 18 is held to the plate 11 by means of screws 22—22 fastened to slide members 23—23, in such a manner that the baffle can be moved relative to the plate 12 thus varying the distance 21. The adjustment of the baffle 18 is finely controlled by means of turnscrews 26—26 threaded through blocks, 27—27 fixed to the plate 11. Where the strip 16 is to be formed into a butt seamed tube 28 the diameter of the tube is, of course, predetermined by the width of the strip, and the distance 21 must be selected to produce a radius of bending in agreement with the butt-seamed tube diameter. Where, however, the tube seam is overlapped, changes in the spacing 21 will have the effect, not only of varying the diameter but of changing the amount of overlap. The seams of the tubes formed by my apparatus as so far described will be longitudinal and I prefer to use my apparatus for tubing with a longitudinal seam. However, if the reel or other means taking up the formed tube is rotated around the line of advance of the strip, and several types of rotating take-up are known, my apparatus will produce tubing with a helical seam.

Figure 5:
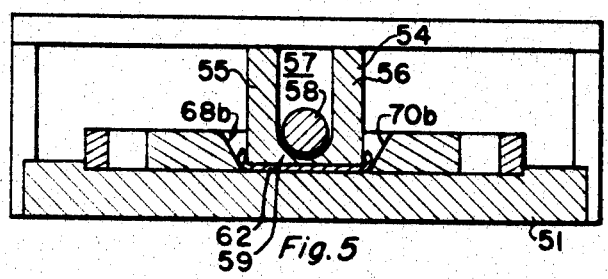
FIGURE 5 shows a section through the line 5—5 of FIGURE 3.
Figure 6:
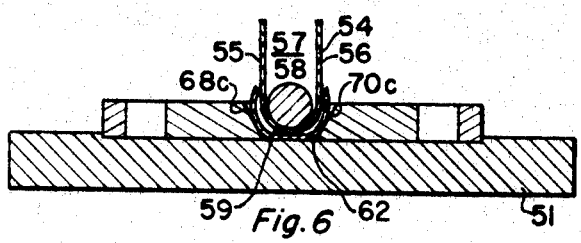
FIGURE 6 shows a section through the line 6—6 of FIGURE 3.
Figure 7:
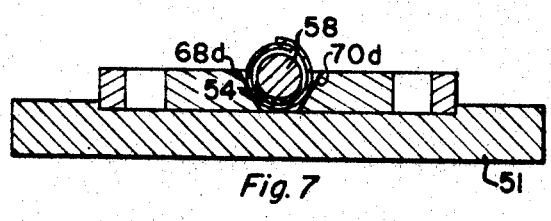
FIGURE 7 shows a section through the line 7—7 of FIGURE 3.

In FIGURES 2-7 my apparatus, indicated generally by the numeral 50, has been particularly adapted to bending a strip around an advancing core. This apparatus comprises a base plate 51 upon which there is erected a frame 52 having cross members 53. From the members 53 there is suspended a U-block 54 which tapers in width toward the downstream end of the apparatus. The block 54 has two wedge-shaped legs 55, 56 between which there is an unobstructed channel 57 for the passage of a core 58 such as an electrical cable core.

The base of the U-block 54 comprises a guide plate 59 spaced just far enough above the plate 51 to provide a smooth passage 61 for a metallic strip 62. Although I have shown an apparatus where the plate 59 is integral with the U-block 54 it will be understood that the plate 59 might be a separate member suspended by the legs 55, 56 within the scope of my invention. Thus the word "plate" as used in this application means a structural member having a plate-like surface. The guide plate 59 has straight edges 63–64 that converge to a point or narrow end 66. Opposing the edge 63 is a baffle 67 made up of sections 67a, 67b, 67c, 67d, with surfaces 68a, 68b, 68c, 68d, parallel to and sloping away from the edge 63. Opposing the edge 64 and the baffle 67 is a baffle 69 comprising sections 69a, 69b, 69c, 69d, with flat surfaces 70a, 70b, 70c, 70d, parallel to and sloping away from the edge 64. The baffle sections 67a, 67b, 67c, 67d, are held to the plate 51 by bolts 71—71 passing through threaded holes in a block 72 and the baffle sections 69a, 69b, 69c, 69d are held by bolts 73—73 threaded through a block 74. Accurate adjustment of the distance of the baffle sections from the edges 63, 64 is accomplished by turning the bolts 71—71, 73—73 in the blocks 72, 74.

Where the guide plate 59 tapers to the degree that it is little wider than the diameter of the core 58 it can no longer be supported by the legs 55, 56 and is cantilevered so that there will be an unobstructed passage for the core.

Thus there is a cantilevered length 76 of the plate 59 at the downstream extremity of the plate. A forming cylinder 77 is mounted on the plate 51 at the downstream end of the apparatus 50, which does not bend the strip but merely holds the tube closed.

In the use of my apparatus of the embodiment of FIGURES 2 and 3, the core 58 is fed from a reel or other source of supply, not shown, through the channel 57 and the die 77 to a take-up device which is not a feature of my invention and may be a capstan or reel. The die 77 may pay directly into an extruding machine. The metal strip 62 of aluminum or annealed copper is supplied from a coil, not shown, into the slot or passage formed between the plates 51 and 59. In threading my apparatus the strip 62 may initially be pulled by hand until it is firmly gripped around the core 58 or it may be tied to a tow line so that it is urged forward with the core. As the strip 62 moves forward its edges strike against the sloping surfaces of the segments 68a, 70a which turn them upwardly. Considering any section across the strip 62 as it advances, the surfaces 68, 70 will come in contact with lengthwise portions of the strip closer to its centerline, and continually bend these portions together. Meanwhile the outer edges, which have been bent in a permanent set continue to curl around the core 58 even though they are not restrained in any way. The legs 55, 56 are tapered sufficiently so that, as the edges of the strip start to curl inwardly as in FIGURE 6, the edges do not strike the outside surfaces of the legs and where this is no longer possible, as in FIGURE 7, the legs have disappeared and the plate 59 is cantilevered.

The operation of the embodiment of FIGURE 1 is similar as illustrated in FIGURES 9 and 10. Here there is no core and the strip 16 is threaded into the passage 14. The leading end of the strip is pulled forward by means of a take-up mechanism, not shown. Due to the blocking effect of the shim 15 the edge of the strip is curled inwardly by the surface 19 of the baffle 18. As any section of the strip advances it continues to strike against the sloping surface 19 and is turned inwardly, until a complete tube is formed.

The distance between the deflecting baffle and the edge of the upper guide plate will depend not only on the diameter of the desired tube but also on the springiness or recovery of the metal forming the strip. Although I have preferred to use dead soft copper or aluminum it will be understood that harder metal may also be used with tighter spacing that allows for some recovery, or increase in radius when the metal is no longer constrained by the baffle.

My apparatus has been particularly useful for bending an aluminum shield around a telephone cable core at high speed where the length of the guide plate was about 23 times the diameter of the shield.

I have invented a new and useful apparatus for which I desire an award of Letters Patent.

I claim:

1. Apparatus for bending a tube from an advancing strip comprising:
   (A) a base plate,
   (B) a guide plate parallel to said base plate and spaced therefrom to define a passage confining and guiding said strip, said guide plate having an edge defining a lengthwise exit from said passage,
   (C) means blocking said passage at an acute angle to said edge thereby compelling said strip to advance from said passage obliquely to said edge,
   (D) a baffle having a flat, strip-deflecting surface opposing and sloping away from said edge.

2. The apparatus of claim 1 comprising means adjusting the distance of said baffle from said edge thereby changing the radius of bending of said strip.

3. Apparatus for bending a tube from an advancing strip comprising:
   (A) a base plate,
   (B) a guide plate parallel to said base plate and spaced therefrom to define a passage comprising and guiding said strip, said guide plate having two edges defining lengthwise exits from said passage,
   (C) two opposed deflecting baffles, each having a flat strip-deflecting surface opposing and sloping away from one of said edges.

4. The apparatus of claim 3 comprising means adjusting the distance between said baffles and said edges thereby changing the radius of bending of said strip.

5. Apparatus for bending a strip around an advancing core comprising:
   (A) a base plate,
   (B) a frame mounted in fixed relation to said plate,
   (C) a guide plate parallel to said base plate and spaced therefrom to define a passage confining said strip,
   (D) said guide plate having two converging edges defining lengthwise exits from said passage,
   (E) support means supporting said guide plate from said frame,
   (F) said support means being spaced to provide an unobstructed passage above said guide plate for said core,
   (G) two opposed deflecting baffles each having a flat, strip-deflecting surface opposing and sloping away from one of said edges.

6. The apparatus of claim 5 comprising means adjusting the distances between said baffles and said edges thereby changing the radius of bending of said strip.

7. The apparatus of claim 5 comprising a cantilevered forward extension of said guide plate.

References Cited

UNITED STATES PATENTS 734,299  7/1903  Cairns _____ 72—176

CHARLES W. LANHAM, *Primary Examiner.*

R. D. GREFE, *Examiner.*